Patented Oct. 5, 1954

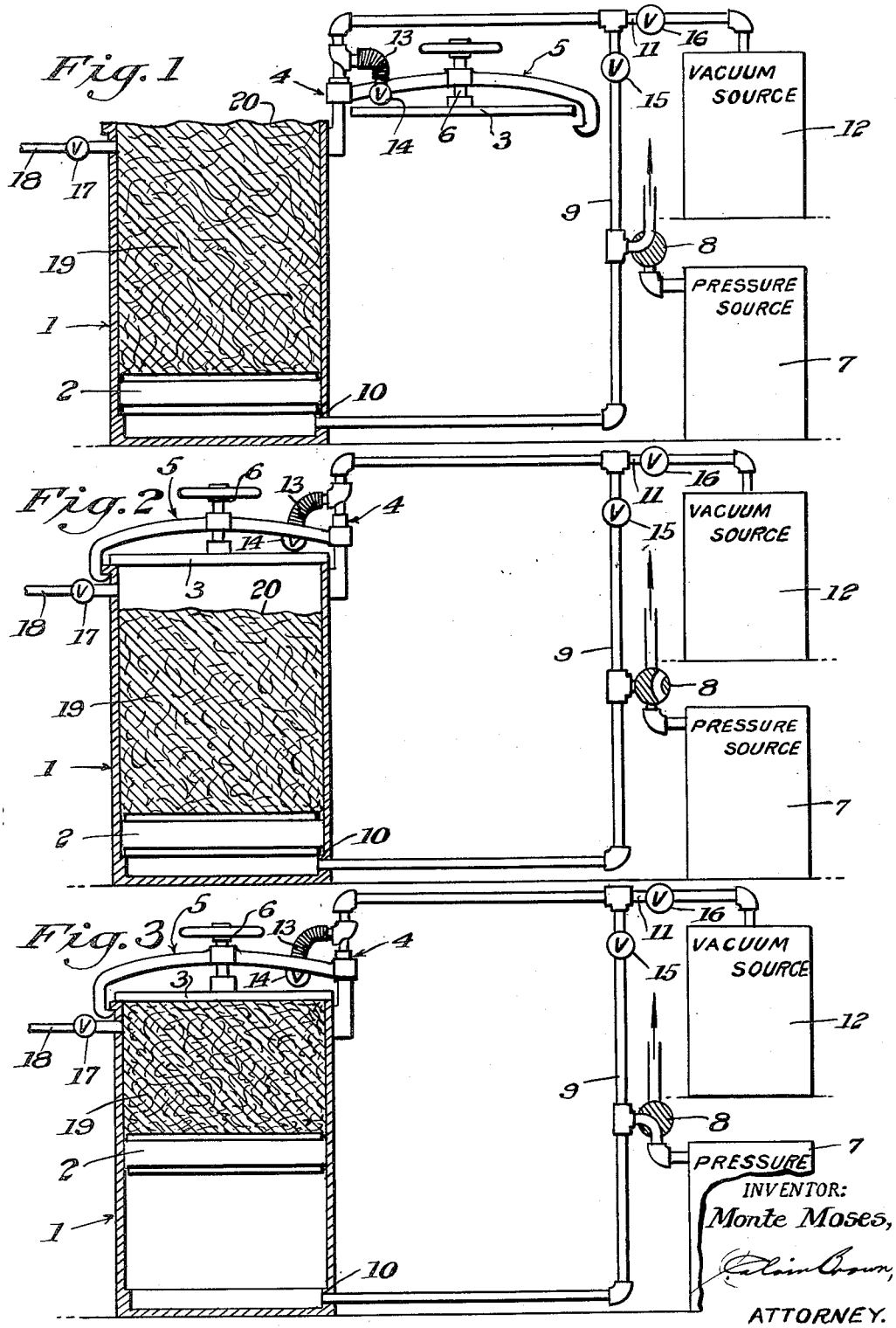

2,690,970

UNITED STATES PATENT OFFICE 2,690,970

METHOD OF STUFFING MEAT

Monte Moses, Los Angeles, Calif.

Original application March 5, 1951, Serial No. 213,911. Divided and this application August 4, 1952, Serial No. 302,510

3 Claims. (Cl. 99—107)

The present invention relates to what is known as stuffers as used in the meat industry, and constitutes a divisional application of my application for Stuffers, Serial No. 213,911, filed March 5, 1951.

It is common in the meat industry to provide pneumatic stuffers of large capacity, say 500 pounds. These stuffers generally comprise a cylinder having a honed cylindrical bore provided with a piston movable within said bore under pneumatic pressure. In addition, the cylinder is provided with a cover which is held thereto by a swing yoke assembly, which yoke may be securely locked to the cylinder. In addition, and at the top of the cylinder, and communicating with the interior thereof, are stuffing outlets, to which valves and stuffing horns are connected. The stuffing horns are utilized for the purpose of directing the food product from the cylinder, when the piston is moved in the bore thereof, to fill cans or casings to a certain weight with a meat product. Ordinarily, the meat product having been chopped by what is known as a silent cutter, and another portion of the formula of the meat product having been ground by a grinder, is then blended together in a mixer. In the case of a meat product which is to be canned, it is necessary that the mixer be vacuumized so that the meat product which is to be canned is free from air. The method as now practiced is for the meat product, as a mass, to be vacuumized in the mixer, followed by transferring the meat product into a stuffer. The transference of the meat product into the stuffer causes a certain degree of air to be admixed with the product. The presence of air in the meat product is detrimental and causes spoilage thereof when the product is canned.

An object of the present invention is to eliminate use of a mixer which must act under vacuum conditions while mixing the meat product, and to eliminate double handling of the meat product, which causes air to admix with the product.

For the benefit of those who are not familiar with the meat industry, it is customary in the forming of so-called luncheon meats, to grind and chop the particular meat and admix the same with flour and other ingredients. The resultant product resembles a heavy emulsion. This heavy emulsion is then transferred by shoveling the emulsion from the mixer into the stuffer. The stuffer, when the cover is closed over the cylinder, has a pneumatically operated piston which moves upwardly within the cylinder to force the emulsion through the stuffing horns and into the cans.

With the present invention, the stuffer is so arranged and constructed that air in said emulsion is removed therefrom, the emulsion then passed through the stuffing horns and into cans free of entrapped air. It is evident that, in the ordinary practice, if air is left in the can, or in the meat product after the can has been sealed, and the meat product cooked in the can, a spoilage would occur due to lack of a vacuum. The present invention assures that this will not occur, as the meat product placed within the can is free of entrapped air, and the vacuum applied to the can during the application of a cover thereto, removes any air from the container and which may surround the meat product.

Further objects comprise a method for removing air from meat products, particularly of the ground type, which is inexpensive of construction, efficient in operation, and generally superior to methods and devices now known to the inventor.

In the drawing, the several figures are diagrammatic, and of which:

Figure 1 is illustrative of a stuffer cylinder and connections with the said cylinder for causing a vacuum therein, Figure 2 shows certain valves closed and other valves opened for the purpose of placing the interior of the stuffer cylinder under vacuum, and, Figure 3 is illustrative, certain of the vacuum valves being closed while pressure is applied beneath the piston within the stuffer cylinder.

Referring now with particularity to the drawings, I have shown at 1 a cylinder having a cylindrical bore and within which cylinder is a piston 2. This piston has a tight fit engagement with the cylindrical wall bounding the bore.

It may be said that the figures are purely diagrammatic and do not illustrate any particular construction for the cylinder or its cover 3, the usual procedure being to provide the cylinder with a mounting 4 for a swing yoke 5 which diametrically spans the cylinder and which yoke centrally carries a screw shaft 6 which is fastened centrally to the cover, the opposite end of the shaft carrying a hand lever or wheel. The cylinder and swing yoke interlock diametrically opposite the mounting 4 whereby the cover may tightly close over the upper end of the cylinder.

I have provided a source of pressure at 7 which may be a pressure tank connected with a compressor whereby air under pressure may be delivered within said cylinder and below the piston for the purpose of raising the piston within the cylinder. This pressure source, whatever its character, is connected through a valve 8 to piping 9 leading to the interior of the cylinder beneath the piston 2, as shown at 10. The piping 9 is in communication with piping 11, which leads to a source of vacuum 12. This source of vacuum may comprise a tank and a compressor utilized for exhausting the tank of air or may be of any form of vacuum pump having a sufficient capacity to vacuumize the meat product within the cylinder 1. The vacuum should equal at least 29 inches of mercury. To accomplish this, the pipe 11 which leads to the vacuum source, communicates with a flexible hose 13 attached to a valve 14 on the cover 3. Interposed within the piping 9 is a valve 15, and between the source of vacuum and piping 9 is a valve 16.

The operation, uses and advantages of the invention just disclosed are as follows:

As shown, the cylinder 1 is provided with stuffing cock or cocks 17, which control passage of meat product from the cylinder through stuffing horn or horns 18. A meat emulsion 19 of the character which is ordinarily used for luncheon meats, is placed within the cylinder 1 to say the height indicated in Figure 1, at 20. The piston 2 is at its lowermost position within the cylinder and the meat product is resting thereon. The cover is then moved from the position shown in Figure 1 to a closed position over the cylinder and secured in air tight engagement therewith. As the meat emulsion settles, the level 20 gradually lowers from the position shown in Figure 1 to the position shown in Figure 2 while the cover 3 is thus being secured. The valve shown at 8 is moved to the position shown in Figure 2, which does not permit any air or other medium under pressure to pass through said valve into the line 9. The valves 14, 15 and 16 are opened, thereby placing the zone beneath the piston and the zone included between the top of the meat product and the cover under vacuum. The valve 17 is, of course, closed. The vacuum gauge will read Zero, but as air is exhausted from the cylinder, the vacuum gauge will move and when the desired vacuum is reached, the valves 14, 15 and 16 are closed. The piston, of course, is prevented from moving within the container and lifting the meat product due to the fact that the zone included between the piston and the bottom of the cylinder is under vacuum, that is to say, under the same negative pressure as that portion included between the top of the meat product and the cover. As this meat product is in emulsion form, any entrapped air within the meat product readily leaves the same and escapes from the meat product, with the result that the meat product is free of entrapped air. After the valves 16, 14, and 15 have been closed which holds the vacuum at the desired degree, the valve 8 may be turned (see Figure 3), so that air under pressure is admitted into the piping 9 from the pressure source 7 to raise the piston within the cylinder, and the meat product under pressure and free of air is directed past valves 17 into the stuffing horn or horns 18, and thence into cans or casings.

Thus, with the present invention, the use of a mixer maintained under vacuum conditions is not necessary, thus eliminating one piece of expensive apparatus, as well as overcoming the labor of double handling.

I claim:

1. The step in the method of operating a stuffer filled with meat emulsion containing entrapped air, said stuffer being of the type employing a cylinder in which a piston is movable from one end of the cylinder toward the discharge end of the cylinder, which discharge end is provided with one or more stuffing horns: which consists in subjecting the horn end of the cylinder to an increasing negative pressure until the vacuum within the cylinder equals a minimum of 29 inches of mercury while simultaneously holding the piston against movement, whereby to prevent the meat emulsion from moving toward the horn end during the freeing of the meat emulsion from its entrapped air.

2. The step of claim 1 in which the piston is held against movement by applying a negative pressure between the piston and the proximate end of the stuffer cylinder.

3. The steps in the method of operating a large capacity pneumatic stuffer of the type having a vertical cylinder closed near its lower end by a snug fitting, freely movable piston and having near its upper end a valved stuffing horn: which comprises filling the cylinder above the piston with meat emulsion containing entrapped air, closing the cylinder against admission of air, exhausting the portion of the cylinder above the piston by negative pressure to remove the air from the meat emulsion, subjecting the portion of the cylinder below the piston to negative pressure to prevent upward movement of the piston, then, after the entrapped air is exhausted from the meat emulsion in the cylinder, closing the upper portion of the cylinder against further negative pressure, applying positive pressure below the piston, and opening the stuffing horn valve, whereby the meat emulsion is discharged through the stuffing horn free of entrapped air.

References Cited in the file of this patent

UNITED STATES PATENTS

| Number | Name | Date |
|---|---|---|
| 2,224,398 | Komarik | Dec. 10, 1940 |
| 2,266,877 | Lindberg et al. | Dec. 23, 1941 |
| 2,313,229 | Dyrek | Mar. 9, 1943 |
| 2,335,738 | Casey | Nov. 30, 1943 |
| 2,343,197 | Makowski | Feb. 29, 1944 |
| 2,362,441 | Jensen | Nov. 14, 1944 |
| 2,466,191 | Wiesman | Apr. 5, 1949 |